US011967256B2

(12) United States Patent
Francoeur

(10) Patent No.: US 11,967,256 B2
(45) **Date of Patent: *Apr. 23, 2024**

(54) TWO-PLY CHANNEL LINER, LABEL, AND ROLL

(71) Applicant: Iconex LLC, Duluth, GA (US)

(72) Inventor: Roger Francoeur, Bennington, NE (US)

(73) Assignee: Iconex LLC, Duluth, GA (US)

( * ) Notice: Subject to any disclaimer, the term of this patent is extended or adjusted under 35 U.S.C. 154(b) by 625 days.

This patent is subject to a terminal disclaimer.

(21) Appl. No.: 17/146,059

(22) Filed: Jan. 11, 2021

(65) Prior Publication Data

US 2021/0134188 A1 May 6, 2021

Related U.S. Application Data

(63) Continuation of application No. 15/411,453, filed on Jan. 20, 2017, now Pat. No. 10,984,683.

(51) Int. Cl.
*G09F 3/02* (2006.01)
*B65C 9/18* (2006.01)
*G09F 3/10* (2006.01)

(52) U.S. Cl.
CPC .............. *G09F 3/0288* (2013.01); *B65C 9/18* (2013.01); *G09F 2003/0229* (2013.01); *G09F 2003/0267* (2013.01); *G09F 2003/0269* (2013.01); *G09F 3/10* (2013.01)

(58) Field of Classification Search
CPC .. G09F 3/0288; G09F 3/10; G09F 2003/0229; G09F 2003/0267; G09F 2003/0269; B65C 9/18
See application file for complete search history.

(56) References Cited

U.S. PATENT DOCUMENTS

| | | | |
|---|---|---|---|
| 4,055,249 | A | 10/1977 | Kojima |
| 5,484,168 | A | 1/1996 | Chigot |
| 5,958,536 | A | 9/1999 | Gelsinger et al. |
| 6,368,688 | B1 | 4/2002 | Crum et al. |
| 7,758,080 | B1 | 7/2010 | Vidler et al. |
| 8,507,065 | B2 | 8/2013 | Milson |

(Continued)

FOREIGN PATENT DOCUMENTS

| | | | |
|---|---|---|---|
| CN | 102016959 | A | 4/2011 |
| CN | 203759721 | U | 8/2014 |
| EP | 2333752 | A1 | 6/2011 |

OTHER PUBLICATIONS

"U.S. Appl. No. 15/411,453, Final Office Action dated Apr. 13, 2020", 9 pgs.

(Continued)

*Primary Examiner* — Patricia L. Nordmeyer
(74) *Attorney, Agent, or Firm* — Schwegman Lundberg & Woessner, P.A.

(57) ABSTRACT

A two-ply liner-label and liner-label-roll are provided. A front side of a liner is coated with a release coating. The liner also includes a plurality of die cut tabs that at least partially align with a second die cut label in the label. The backside of the label is coated with an adhesive material and applied to the front side of the liner to form a liner-label roll. The tabs remain affixed to their corresponding individual labels when the labels are removed for placement on packaging; thereby, leaving holes in the liner as the liner is wound into a waste-liner roll within an auto applicator machine.

20 Claims, 5 Drawing Sheets

(56) References Cited

U.S. PATENT DOCUMENTS

| | | | |
|---|---|---|---|
| 9,159,250 | B2 | 10/2015 | Hong et al. |
| 10,056,013 | B1 | 8/2018 | Napierala |
| 10,984,683 | B2 | 4/2021 | Francoeur |
| 2004/0195824 | A1 | 10/2004 | Blank |
| 2004/0250947 | A1 | 12/2004 | Phillips et al. |
| 2008/0061548 | A1 | 3/2008 | Kuranda et al. |
| 2010/0109316 | A1 | 5/2010 | Hong et al. |
| 2010/0129583 | A1 | 5/2010 | Hong et al. |
| 2011/0177277 | A1 | 7/2011 | Milson |
| 2012/0284184 | A1 | 11/2012 | McGivney et al. |
| 2014/0060729 | A1 | 3/2014 | Srnka et al. |
| 2018/0211570 | A1 | 7/2018 | Francoeur |

OTHER PUBLICATIONS

"U.S. Appl. No. 15/411,453, Non Final Office Action dated Apr. 2, 2019", 8 pgs.
"U.S. Appl. No. 15/411,453, Non Final Office Action dated Aug. 19, 2020", 12 pgs.
"U.S. Appl. No. 15/411,453, Notice of Allowance dated Dec. 9, 2020", 13 pgs.
"U.S. Appl. No. 15/411,453, Response filed Jun. 15, 2020 to Final Office Action dated Apr. 13, 2020", 7 pgs.
"U.S. Appl. No. 15/411,453, Response filed Jul. 13, 2020 to Advisory Action dated Jun. 22, 2020".
"U.S. Appl. No. 15/411,453, Response filed Nov. 19, 2020 to Non Final Office Action dated Aug. 19, 2020", 9 pgs.

TWO-PLY CHANNEL LINER, LABEL, AND ROLL

RELATED APPLICATIONS

This application is a continuation of U.S. patent application Ser. No. 15/411,453, filed Jan. 20, 2017, which application is incorporated herein by reference in its entirety.

BACKGROUND

The ubiquitous adhesive label is available in a myriad of configurations for use in various applications, including specialty applications. The adhesive label includes an adhesive on its back side and is initially laminated to an underlying release liner.

Adhesive labels may be found in individual sheets, or joined together in a fan-fold stack, or in a continuous roll (web). Label rolls are typically used in commercial applications requiring high volume use of labels.

The challenge with liner-based adhesive rolls is that as the label is removed from the liner while the web is processed through an auto applicator machine and the label is affixed to a package, the underlying liner is rewound as waste in the machine and the tension in the liner grows causing the liner to break. Swapping out the feed roll and/or removing the waste-liner roll means stopping the machine and having specialized staff remove the waste-liner roll and refeed (rethread) the remaining combined liner-label roll for continued processing or swapping out the liner-label roll with a new liner-label roll. Because of this tension in the liner between the feed roll and the accumulating waste roll, the size of the waste-liner label roll is limited (meaning the total number of labels that can be applied to packaging by the machine before waste-liner roll is removed and/or a new liner-label roll is refed in the machine is limited).

Because maximizing the total number of labels that can be applied by the machine without manual media maintenance is the goal in the industry, most liner-label rolls are constructed as three-ply (three substrates) layered on top of one another. The rolls include two liners and the label (three ply or three independent substrates). This allows the feed and waste rolls to withstand a greater tension before breakage within the machine and is believed in the industry to be an optimal solution. However, 1) this additional substrate is costly to manufacture; 2) label capacity through conventional auto applicator machines has stagnated, and 3) the three-ply approach creates greater waste byproduct (three substrates).

SUMMARY

In various embodiments, a liner-label, a liner-label roll, and an auto applier machine are provided.

According to an embodiment, a liner-label is provided. The liner label includes: a liner, a label, a die cut second label in the label, and a plurality of die cut tabs in the liner. A backside of the label affixed to a front side of the liner with the tabs at least partially aligned to the second label.

DETAILED DESCRIPTION

As will be described more completely herein and below, a two-ply channel liner-label, liner-label roll, and an auto applicator are presented.

The term "channel" a die cut portion of a substrate defined by a weakened periphery that outlines the portion.

Figure 1:
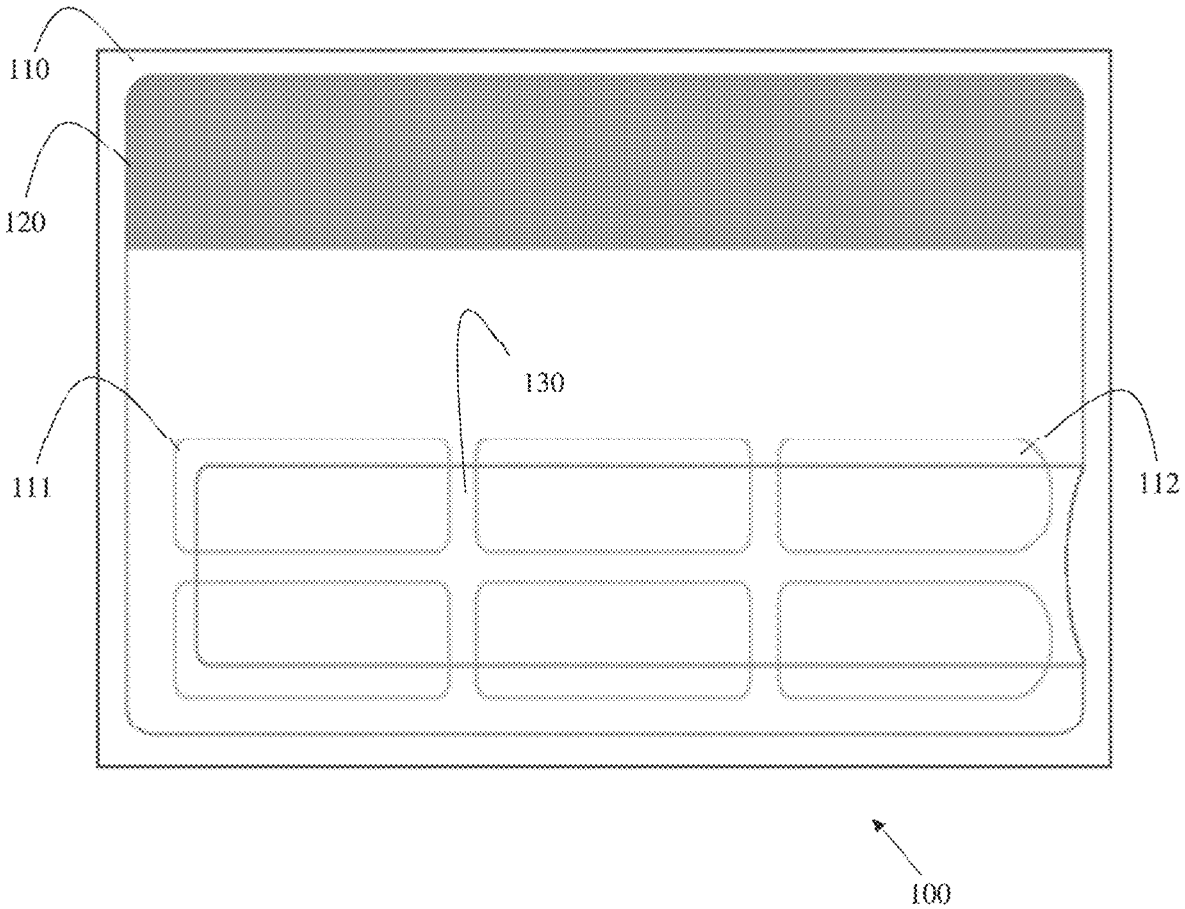
FIG. 1 is a diagram of a liner-label, according to an example embodiment.

FIG. 1 is a diagram of a liner-label 100, according to an example embodiment. It is noted that the dimensions of the liner 110 and the label 120 (and 130 a second label removable from label 120) can vary in various embodiments presented herein and below.

The liner-label 100 includes: a liner 110 with die cut channel portions representing. die cut tabs 111 and 112, and a label 120 with a separate removable second label 130.

The liner 110 is part of a web or roll 200 (discussed below with reference to the FIG. 2). The liner 110 is a substrate coated with a release coating (water-based substantially free of silicone or silicon-based). A front side of the liner 110 is manufactured with a label 120 applied thereon. The backside of the label 120 includes an adhesive coating.

The label 120 includes a separate die cut second label 130.

An auto applicator machine (such as 300 discussed below with the FIG. 5) is loaded with the liner-label 100 and automatically removes the label 120 from the liner 110 and applies the label 120 to packaging that passes under a portion of the machine on a transport belt (conveyor belt). When the package is received, the recipient can remove the second label 130 from the label 120 that is affixed to the package. The second label 130 can then be applied to other items/objects, such as a product (the front side of the second label 130 including printed information thereon, such as a barcode or Quick Response (QR) code or other written information and/or graphics).

The front side of the label 120 and the second label 130 includes printed information, such that the front side of the label 120 (the portion that does not include the second label 130) can include addressing information for a destination of the packaging while the front side of the second label can including retailer specific information for a product enclosed in the packaging (such as a product barcode). It is noted that this particular described application for the labels 120 and 130 is but one scenario and a variety of other useful applications can be used with the novel teachings herein of the liner-label 100.

The backside of the label 120 (including the second label 130) includes an adhesive coating such that when the label 120 is removed as a unit (including the second label 130) from the liner 110, the label 120 adheres to the packaging.

However, and unlike conventional approaches, when the auto applicator machine 300 removes the label 120 from the liner 110, the die cut tabs 111 and 112 are removed with the label 120 creating voids or holes in the liner 110 and assuring that a portion defined by the accompanying die cut liner tabs 111 and 112 do not adhere to the package because the backside of the tabs 111 and 112 lack an adhesive coating and the backside of the tabs 111 and 112 are pressed on the packaging as part of the backside of the label 120.

The die cut tabs 111 and 112 create a channel on a portion of the label 120 that includes the second label 130 that is devoid of any adhesive material. The tabs 111 and 112 cover and substantially shield the adhesive material that is on a portion of the label 120 that includes the second label 130. In fact, a substantial area of the backside of the second label 130 has its adhesive coating protected and shielded by the tabs 111 and 112. The tabs 111 are slightly different from the tabs 112. The tabs 112 (two of the six are rounded, which allows for a greater surface area of tab coverage on the backside of the label 120 and 130) near an edge where the second label 130 is removed from the label 120. Additionally, the edge of the second label 130 is curved inward away from the edge of the label 120. The geometric configuration provides strength to the second label 130 and permits easier removal from the label 120 without tearing or damage to the second label 130. Also note that an inside perimeter portion (along the bottom and side edges) of the backside of the label 120 includes the adhesive coating as does a small portion of the backside of the second label 130 (the curved in edge portion). This ensures that the label 120 adheres to the packaging, even though the area defined by the tabs 111 and 112 that accompanies the label 120 when removed from the liner 110 will not adhere to the packaging because that area defined by the tabs 111 and 112 is devoid of any adhesive material. Additionally, an area that is not covered by the tabs 111 and 112 along the backside of the second label 130 includes a small amount of adhesive, which permits a minimal amount of adhesion between the backside of the second label 130 and packaging.

In an embodiment, the dimensions of the liner 110 is approximately 4.625 inches in length and approximately 3.125 inches in height. The label 120 is approximately between 4.375 and 4.5 inches in length and approximately 2.875 and 3 inches in height. The die cut tabs 111 and 112 of the liner 110 are each approximately 1.25 inches in length and between 0.40625 and 0.5 inches in height.

Figure 2:
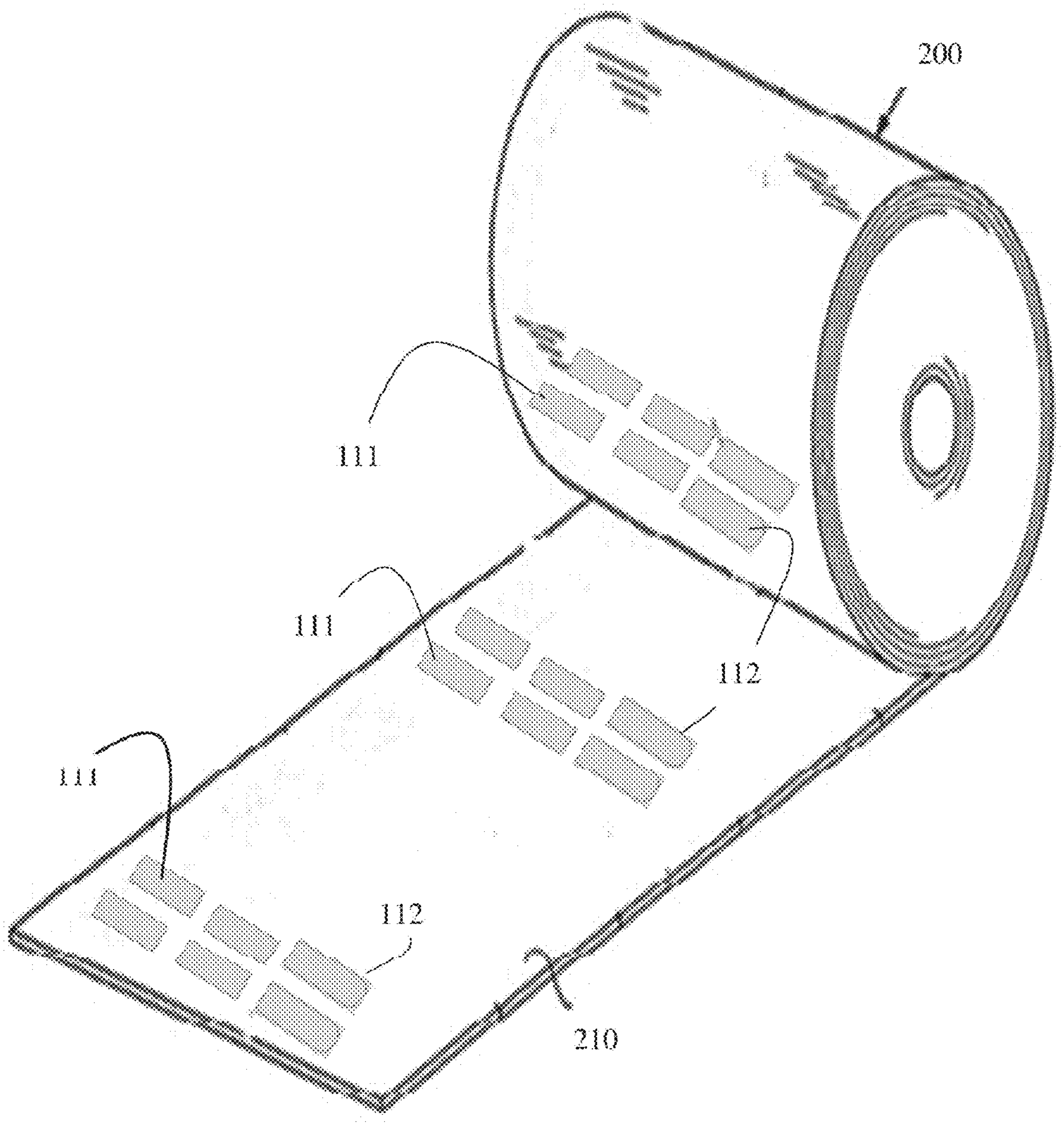
FIG. 2 is a diagram of a liner-label roll having, according to an example embodiment.

FIG. 2 is a diagram of a liner-label roll 200 having, according to an example embodiment.

The liner-label roll 200 is a two-ply (two independent substrates) that includes: a first substrate 210 having die cut tabs 111 and 112, which are die cut within the first substrate 210; and a second substrate that includes a series of individual labels 120 (not shown in the FIG. 2 but shown in the FIG. 1 above, each label 120 may be preprinted or may include no printing that can subsequently be printed upon with information to define an individual label 120. Printing on a front side of each label 120 can occur through thermal printing (such as when the front side of the second substrate includes a thermally activated coating) or can occur through laser or dot matrix printing.

The second substrate also includes a die cut for each label 120 that defines the independent removable second label 130 within label 120. The backside of the second substrate is coated with an adhesive so it sufficiently adheres to the front side of the first substrate 210.

The tabs 111 and 112 are die cut from the liner 110 and are removed from the liner 110 when the auto applicator machine 300 removes the labels 120. This results in holes 201 (shown in the FIGS. 3A and 3B below) in the liner 110 within the waste-liner roll. The auto applicator machine 300 winds the liner 110 into a waste-liner roll, which includes the holes 201. This reduces the weight of the waste-liner roll as it is wound within the auto applicator machine 300, which reduces the tension on the liner-label roll 200 being fed through the auto applicator machine 300. The result of this is that the auto applicator machine 300 can apply a greater number of labels 120 to packaging than conventional approaches.

That is, testing has shown that conventional auto applicator machines and liner-label rolls can dispense approximately 10,000 labels before rethreading of an existing roll or a replacement roll is needed by skilled manual intervention. The novel liner-label roll 200 including the novel holes 201 in the waste-liner roll can be dispensed by an auto applicator machine for approximately 14,000 to 15,000 labels 120 (a 40-50% improvement) before needing manual intervention. This reduces media replenishment labor and media expenses (two substrates now and conventionally three substrates were needed). Additionally, the approaches presented herein also reduce environmental waste by removing at least one wasted substrate in the novel two-ply channel liner-label 120.

Figure 3A:
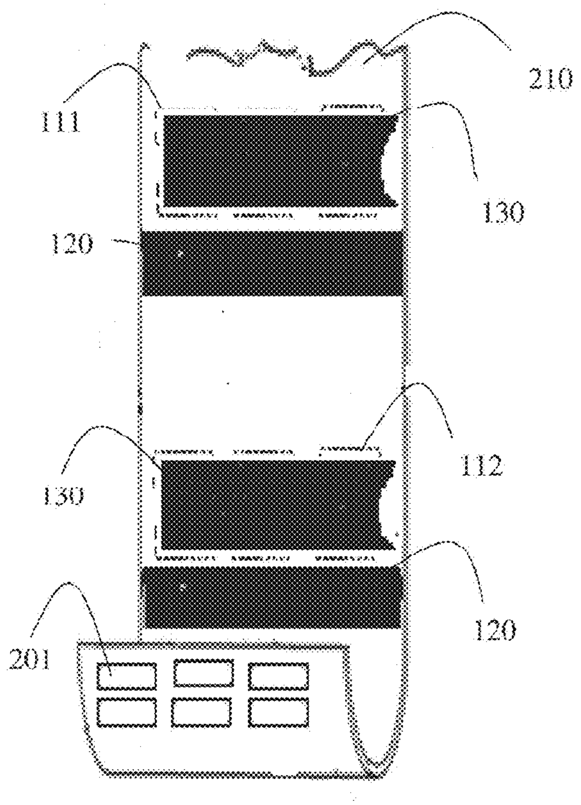
FIG. 3A is a diagram depicting a strip of a liner-label roll from the FIG. 2, according to an example embodiment.

FIG. 3A is a diagram depicting a strip of a liner-label roll 200 from the FIG. 2, according to an example embodiment.

The strip shown in the FIG. 3A shows a front side 210 of the liner 110 from a roll 200 and includes a plurality of labels 120 each having a second die cut label 130 along with the liner tabs 111 and 112. The bottom of the strip shows a removed label and the resulting liner 110 having the holes 201 where the tabs have been removed with the removed label 120.

Figure 3B:
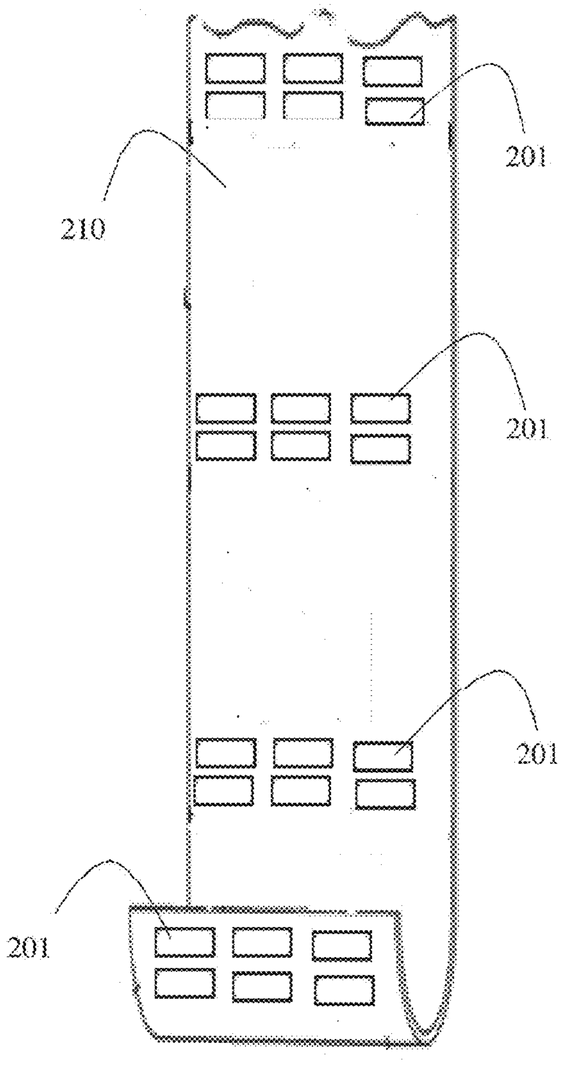
FIG. 3B is a diagram depicting a strip of a liner after removal of the labels as a portion of a waste-liner roll, according to an example embodiment.

FIG. 3B is a diagram depicting a strip of a waste-liner roll after removal of the labels 120 as a portion of a waste-liner roll, according to an example embodiment.

The front side 210 illustrates the holes 201 left after an auto applicator machine 300 has removed the labels 120 (including 130) along with the tabs 111 and 112 from the liner 110. This reduces the weight of the liner 110 in the waste-liner roll and ensures that tension between a liner-label roll 200 (being fed through the auto applicator machine 300) and the maintained waste-liner roll is more efficiently distributed from conventional three-ply approaches.

Figure 4A:
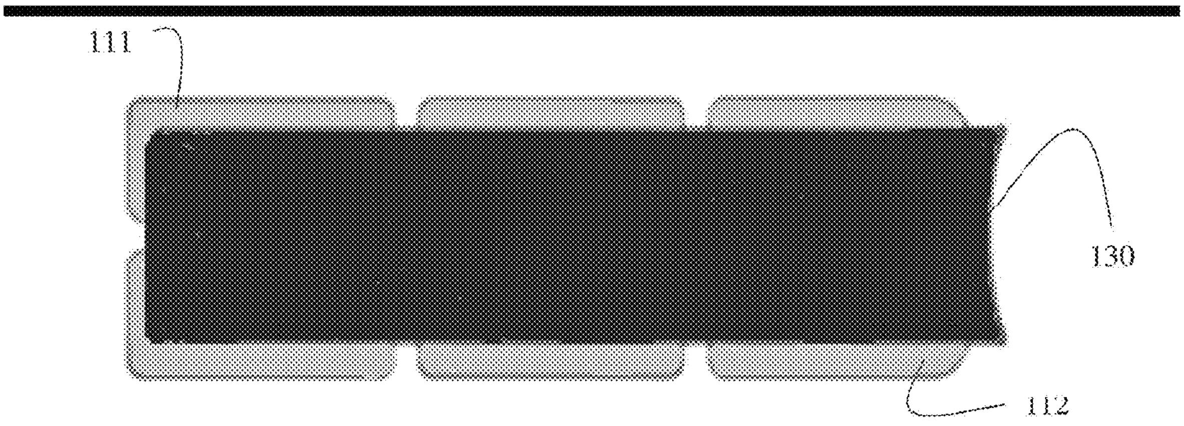
FIG. 4A is a diagram depicting an isolated view of a front side of a second label independent of the composite label (shown in the FIG. 1) from the liner-label roll, according to an example embodiment.

FIG. 4A is a diagram depicting an isolated view of a front side of a second label 130 independent of the composite label 120 from the liner-label roll 200, according to an example embodiment.

The second label 130 has a substantial portion of its backside covered by the tabs 111 and 112, which acts as a buffer between the backside of the second label 130 and the liner 110 of the roll 200. Another portion of the tabs 111 and 112 also cover a portion of the backside of the label 120 (not shown in the FIG. 4A but visible in the FIG. 1).

The curved or concave shape of the rightmost end of the label 130 provides access for grabbing the label 130 and removing the label 130 from label 120 that maybe affixed to packaging.

The tabs 111-112 also slightly elevate the label 130 above a surface of any packaging to which the label 120 is affixed. Again, the backsides of the tabs 111-112 are adhesive free (devoid of any adhesive), such that the area defined and covered by the backsides of the tabs 111-112 do not adhere to the packaging.

When the label 130 is removed from the label 120 and separated from the packaging, the tabs remain affixed under the backside of the label 120 and against the surface of the packaging, such that there is no debris and such that the label 130 can be directly applied to a product (because the front side of the tabs 111-112 were coated with a release coating and the backside of the label 130 included the adhesive coating).

Figure 4B:
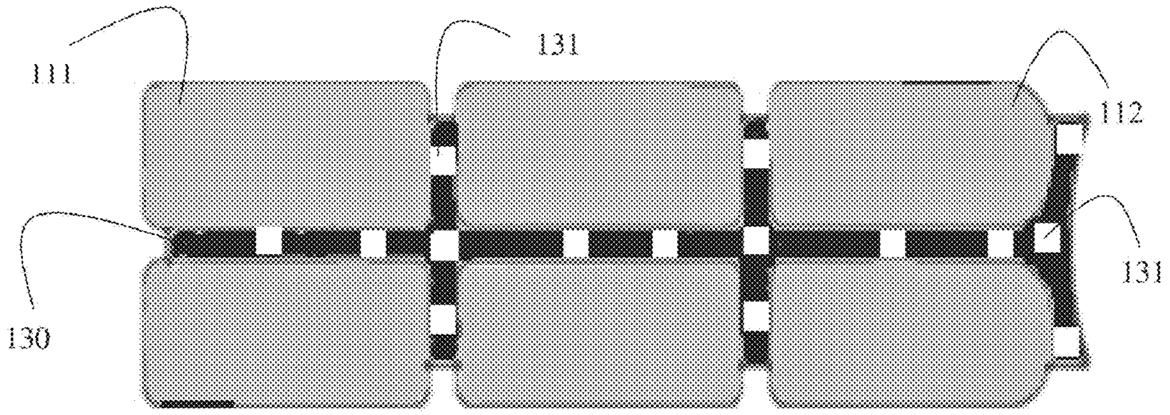
FIG. 4B is a diagram depicting an isolated view of a backside of the second label independent of the composite label (shown in the FIG. 1) from liner-label roll, according to an example embodiment.

FIG. 4B is a diagram depicting an isolated view of a backside of the second label 130 independent of the composite label 120 from the liner-label roll 200, according to an example embodiment.

The label 130 is die cut from the label 120. As such, until the label 130 is removed from the label 120 it remains part of the label 120. The entire backside of the label 120 is coated with adhesive 131. The tabs 111-112 are removed from the liner 110 when the label 120 is removed from the liner 110 and applied to packaging. The backside view of the label 130 illustrates that a small portion (portion not buffered and covered by the tabs 111-112) of the backside of the label 130 includes adhesive material/coating. This allows for a small surface area of the backside of the label 130 to adhere to any packaging to which the label 120 is applied. This provides a minimal amount of adhesion to the packaging but not enough adhesion to prevent the label 130 from being easily removed from the label 120 and the packaging and applied to an item/object (product). Moreover, well over 60-70% of the backside of label 130 once removed from the packaging, the second label 120, and the tabs 111-112 still includes active adhesive material because the tabs 111-112 include a release coating where interfaced to the backside of the label 130.

Although, the adhesive material 131 is shown as a spot or patterned arrangement, this does not have to be the case as the entire backside can include an adhesive coating 131 in some embodiments.

Figure 5:
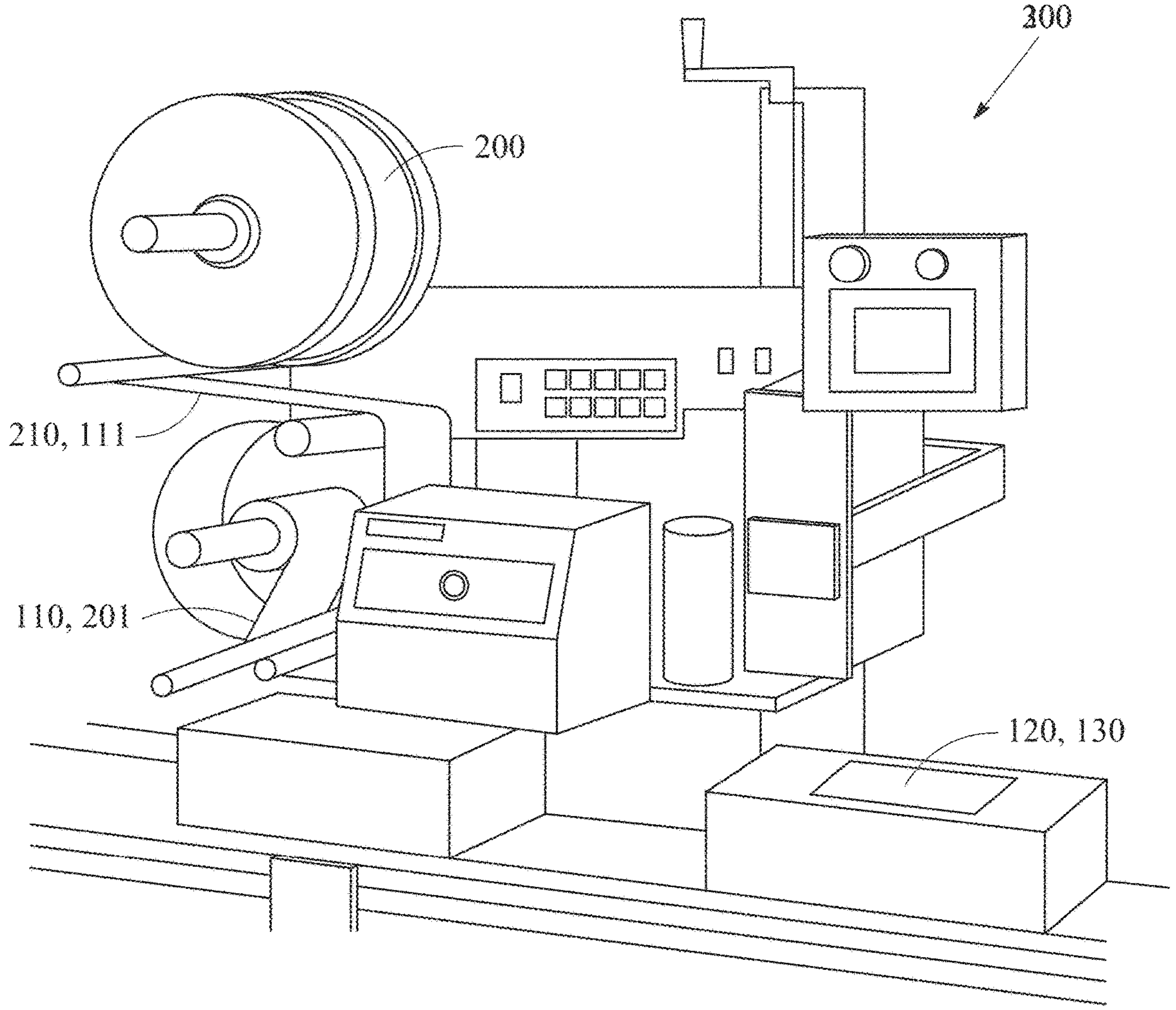
FIG. 5 is a diagram an auto applicator machine for applying a label to packaging from the liner-label roll and winding the waste-liner roll within the auto applicator machine, according to an example embodiment.

FIG. 5 is a diagram an auto applicator machine 300 for applying a label to packaging from the liner-label roll and winding the waste-liner roll within the auto applicator machine, according to an example embodiment.

The auto applicator machine 300 presented is one type of auto applicator machine 300. That is, other types and configurations can be used with the novel liner-label rolls 200 and liner-labels 120 presented herein and above.

A liner-label roll 200 is loaded into the machine 300 and the front surface 210 having the labels 120 with the tabs 111 are oriented properly during the load. The machine 300 removes the label 120 that includes the die cut label 130 from the liner 110 and automatically applies to packaging. The liner 110 that now includes the holes 201 for the removed tabs 111-112 is then fed into a waste-liner roll (bottom spool in the FIG. 5).

The package can then be delivered and an operator can remove the label 130. The tabs 111-112 remain under the backside of label 120 that remains adhered to the package. Over approximately 70% of the backside of the removed label 130 includes unadulterated adhesive material, such that the removed label 130 can be applied to a product (item or object).

One now appreciates how the novel liner-label 120 and liner-label roll 200 can improve capacity processing (per roll) in an auto applicator machine 300 by optimally maintaining tension in the liner 110 as the machine 300 dispenses the labels 120 onto packaging. This also provides reduced waste byproduct since two-plys (substrates) are used in the liner-label roll 200 as opposed to the conventional approach utilizing three-plys (substrates).

Although the present invention has been described with particular reference to certain preferred embodiments thereof, variations and modifications of the present invention can be effected within the spirit and scope of the following claims.

The invention claimed is:

1. A roll of liner-label combinations, comprising:

a liner web comprising first die cuts that define tabs in the liner web;

a label web comprising second die cuts that define labels in the label web;

wherein each liner-label combination of the roll comprises a label and a pair of the tabs;

wherein each pair of tabs correspond to an aligned coverage area of the corresponding label;

wherein each label adapted to be separated from the corresponding liner-label combination with the corresponding pair of the tabs remaining attached to a backside of the corresponding label so that when the corresponding pair of the tabs are separated from the corresponding label adhesive remains on the backside to permit the corresponding label to be affixed to an object, wherein a first tab or each pair of tabs runs horizontally and parallel with the corresponding label above a second tab of each pair of tabs that runs horizontally and parallel within the corresponding label, wherein a tab bottom edge of the first tab is vertically stacked above and aligned with a tab top edge of the second tab.

2. The roll of liner-label combinations of claim 1, wherein each pair of the tabs is rectangular in shape with one end of each of the corresponding tabs be rounded.

3. The roll of liner-label combinations of claim 2, wherein the ends of the tabs that are rounded are adjacent to a release edge of the corresponding label.

4. The roll of liner-label combinations of claim 3, wherein the release edge of the corresponding label is curved inward.

5. The roll of liner-label combinations of claim 4, wherein the release edge of the corresponding label forms a portion of an edge of the corresponding liner-label combination.

6. A liner-label combination, comprising:

a substrate defining a first label and a second label that is defined by a first die cut made within the substrate;

a liner comprising a pair of tabs defined by two equally sized and shaped second die cuts made within the liner;

wherein a backside of the substrate comprises an adhesive coating;

wherein a front side of the liner that corresponds to the pair of tabs comprises a release coating;

wherein the substrate is adhered to the liner to form the liner-label combination with the pair of tabs aligned to correspond to a coverage area of the backside of the second label wherein a first tab or the pair of tabs runs horizontally and parallel with the second label above a second tab of the pair of tabs that runs horizontally and parallel within the second label. wherein a tab bottom edge of the first tab is vertically stacked above and aligned with a tab top edge of the second tab.;

wherein a portion of the first tab in the pair extends beyond a top edge of the second. label;

wherein another portion of the second tab in the pair extends beyond a bottom edge of the second label;

wherein the second label is adapted to be separated from the liner-label combination with the pair of tabs remaining affixed to the second label;

wherein the pair of tabs adapted to be separated from the second label with a portion of the adhesive coating remaining on the backside of the second label.

7. The liner-label combination of claim 6, wherein the first tab extends from approximately a center of the coverage area beyond the top edge of the second label, and wherein the second tab extends from approximately the center of the coverage area beyond the bottom edge of the second label.

8. The liner-label combination of claim 6, wherein a front side of the substrate comprises a thermally activated print layer.

9. A liner-label, comprising:

a liner substrate:

a label substrate;

at least one die cut label in the label substrate that defines a label;

a pair of die cut channels in the liner substrate;

wherein a first die cut channel of the pair is partially aligned beneath a top-edge of the label defining a first liner tab;

wherein a second die cut channel of the pair is aligned beneath a bottom edge of the label defining a second liner tab;

wherein the first liner tab runs horizontally and parallel with the label above the second liner tab which runs horizontally and parallel within the label;

wherein a tab bottom edge of the first liner tab is vertically stacked above and aligned with a tab top edge of the second liner tab and the first liner table and second liner tab correspond to an aligned coverage area for the label;

wherein the first liner tab corresponds to a first half of the aligned coverage area and extends along the liner substrate beyond the top-edge of the label;

wherein the second liner tab corresponds to a second half of the aligned coverage area and extends along the liner substrate beyond the bottom edge of the label;

wherein the label is adapted to be separated from the liner substrate with the first die cut tab and the second die cut tab being removed with the label from the liner substrate and remaining affixed to a backside of the label.

10. The liner-label combination of claim 9, comprising one or more additional die cut labels in the label substrate defining one or more additional labels.

11. The liner-label combination of claim 10, wherein each of the one or more labels are associated with an additional pair of die cut channels in the liner substrate.

12. The liner-label combination of claim 9, wherein the backside of the label substrate comprises an adhesive coating and a front side of the liner substrate comprises a release coating.

13. The liner-label combination of claim 12, wherein a front side of the label substrate comprises a thermally activated print layer.

14. The liner-label combination of claim 9, wherein at least one end of both the first liner tab and the second liner tab is rounded and adjacent to a curved-inward end of the label.

15. The liner-label combination of claim 14, wherein the curved-inward end of the label is part of an outer edge for the label substrate.

16. The liner-label combination of claim 9, wherein the first liner tab and the second liner tab are adapted to be peeled away from the label with an adhesive retained on the first area of the backside for the label permitting the label to be affixed to an object when the first liner tab and the second liner tab are peeled away and separated from the label.

17. The liner-label combination of claim 9, wherein the first half of the aligned coverage extends from approximately a center of the label to the top edge of the label, and wherein the second half of the aligned coverage area extends from approximately the center of the label to the bottom edge.

18. The roll of liner-label combinations of claim 17, wherein a front side of the label web comprises a thermally activated print layer.

19. The roll of liner-label combinations of claim 17, wherein each pair of the tabs comprises a same length and height and the length is greater than the height.

20. The liner-label combination of claim 9, wherein the first liner tab and the second liner tab have a same length and height and the length is greater than the height.

* * * * *